United States Patent [19]

Toyooka et al.

[11] Patent Number: 5,430,115

[45] Date of Patent: Jul. 4, 1995

[54] MALEIMIDE COPOLYMER AND A PROCESS FOR PRODUCING THE SAME

[75] Inventors: Yutaka Toyooka; Atsushi Kimura, both of Otake; Yasunori Tsuneshige, Yanai; Katsutoshi Kajimura, Tokyo, all of Japan

[73] Assignee: Mitsubishi Rayon Co., Ltd., Tokyo, Japan

[21] Appl. No.: 258,374

[22] Filed: Jun. 10, 1994

Related U.S. Application Data

[63] Continuation of Ser. No. 53,817, Apr. 29, 1993, abandoned, which is a continuation of Ser. No. 794,624, Nov. 18, 1991, abandoned, which is a continuation of Ser. No. 390,959, Aug. 9, 1989, abandoned.

[30] Foreign Application Priority Data

Aug. 15, 1988 [JP] Japan ................. 63-202842

[51] Int. Cl.$^6$ ............... C08F 222/40; C08F 220/10; C08F 220/44; C08F 212/06
[52] U.S. Cl. ............... 526/262; 526/328.5; 526/342; 526/347
[58] Field of Search ............... 526/262, 328.5, 342, 526/347

[56] References Cited

U.S. PATENT DOCUMENTS

| | | | |
|---|---|---|---|
| 4,323,662 | 4/1982 | Oba et al. | 525/281 |
| 4,661,574 | 4/1987 | Younes | 526/262 |
| 4,786,738 | 11/1988 | Kita et al. | 548/545 |
| 4,918,152 | 4/1990 | Moritani et al. | 526/262 |
| 5,191,046 | 3/1993 | Iwamoto et al. | 526/262 |

FOREIGN PATENT DOCUMENTS

| | | | |
|---|---|---|---|
| 0204548 | 12/1986 | European Pat. Off. | |
| 58-162616 | 9/1983 | Japan. | |
| 60-79019 | 5/1985 | Japan. | |
| 61-276807 | 12/1986 | Japan. | |
| 62-223208 | 10/1987 | Japan. | |
| 62-223206 | 11/1987 | Japan | 526/262 |
| 62-270648A | 11/1987 | Japan. | |
| 753882 | 8/1956 | United Kingdom. | |

OTHER PUBLICATIONS

Polymer Processes; Schildknecht, Interscience Publishers; *Poymerzations in Solution*:(1956), pp. 175-198.
Poymerization Processes,; Schildknecht and Skeist, Wiley-Interscience Publication *Continuous Polymerzation processes*, pp. 449-467 (1977).
High Polymers, vol. X; Schildknecht, Interscience publishers; *Polymerizations in Solution*: (1956) pp. 175-198.
High Polymers, vol. XXIX; Schildknecht and Skeist, Wiley-Interscience Publication *Continuous Polymerization Processes*, pp. 449-467 (1977).
Chemical Abstracts, vol. 68, No. 10, 1968, Abstract No. 40127g.

*Primary Examiner*—Joseph L. Schofer
*Assistant Examiner*—Wu C. Cheng
*Attorney, Agent, or Firm*—Armstrong, Westerman, Hattori, McLeland, & Naughton

[57] ABSTRACT

A maleimide copolymer which consists essentially of greater than 28% by weight and less than or equal to 65% by weight of a maleimide monomer unit, greater than or equal to 16% by weight and less than 72% by weight of at least one monomer unit selected from the group consisting of aromatic vinyl compound monomer units and methacrylate monomer units, and 0-25% by weight of another vinyl compound monomer unit and which contains 0.1% by weight or less of the residual maleimide monomer and 0.5% by weight or less of volatile components other than the maleimide monomer and which has a ratio (Mw/Mn) of a weight average molecular weight Mw to a number average molecular weight Mn of 3 or less, a yellowness index of 30 or less and an intrinsic viscosity of from 0.3 to 1.5. The maleimide copolymer of the present invention is excellent in heat resistance, transparency, chemical resistance, impact resistance, moldability and the like.

9 Claims, 1 Drawing Sheet

MALEIMIDE COPOLYMER AND A PROCESS FOR PRODUCING THE SAME

This application is a Rule 62 continuation application Ser. No. 08/053,817, filed Apr. 29, 1993, now abandoned, which is a continuation of Ser. No. 07/794,624, filed Nov. 18, 1991, now abandoned, which is a continuation of Ser. No. 07/390,959, filed Aug. 9, 1989, now abandoned.

BACKGROUND OF THE INVENTION

1. Field of the Invention

The present invention relates to a novel maleimide copolymer which is excellent in heat resistance, transparency, chemical resistance, impact resistance and moldability, and to a process for producing the same.

2. Description of Related Art

The applications of transparent molding materials have been widened recently. For example, there are exemplified optical information storage carrier of a videodisk, an audiodisk, etc., lenses of a camera, an optical pickup, etc., a cover of a headlight of a car and the like. High heat resistance and high impact resistance have been required for these applications.

A polycarbonate resin has been heretofore used as a transparent heat-resistant molding material. The polycarbonate resin is a transparent resin excellent in heat resistance and impact resistance. For the above-mentioned applications, however, the polycarbonate resin has a drawback in that it is relatively expensive and inferior in chemical resistance and moldability. The applications thereof is, therefore, limited.

Various copolymers of maleimide monomers and other vinyl compound monomers have been proposed as resins which are excellent in heat resistance (Japanese Patent Application Kokai No. 58-162616, Japanese Patent Application Kokai No. 61-276807 and Japanese Patent Application Kokai No. 60-79019). The maleimide copolymers proposed in these patent applications are not, however, satisfactory for the above-mentioned uses. Particularly, there are few reports on the improvement of coloration (decrease in yellowing), which is essential for transparent molding materials. Emulsion polymerization or suspension polymerization is often conducted in the polymerization of a maleimide monomer. Since, however, an emulsifier and the other auxiliaries cause considerable coloration, the emulsion and suspension polymerization are not suitable for the production of transparent molding materials.

In order to improve properties such as transparency and the like, bulk polymerization or solution polymerization is preferably conducted. Since a maleimide monomer, however, exhibits a very high rate of polymerization and therefore is easy to polymerize by itself, the obtained copolymer results in a wide molecular weight distribution, a wide composition distribution and inferior impact resistance.

The maleimide copolymer of the present invention has as high heat resistance as polycarbonate resins. For that purpose, the particular range of the amount of a maleimide monomer is prescribed. When the amount is over the range, the obtained copolymer is inferior in impact resistance and fluidity. The fed amount of the other vinyl compound monomers used in the present invention are also limited to the particular range.

When an unreacted maleimide monomer exists in the obtained copolymer, the copolymer is inferior in transparency and is colored considerably.

Therefore, polymerization methods and the removal of unreacted monomers and organic solvents must be investigated eagerly.

SUMMARY OF THE INVENTION

The present inventors have found that a novel maleimide copolymer can be obtained by subjecting a mixture of some monomers particularly mixed and an organic solvent in a particular ratio to continuous polymerization and then removing unreacted monomers and the organic solvent in a devolatilizer, in the polymerization of a maleimide copolymer.

An object of the present invention is to provide a novel maleimide copolymer which is excellent in heat resistance, transparency, chemical resistance, impact resistance and moldability.

Another object of the present invention is to provide a process for producing said maleimide copolymer.

Other objects and advantages of the invention will be apparent from the following description.

The present invention relates to a maleimide copolymer which consists essentially of greater than 28% by weight and less than or equal to 65% by weight of a maleimide monomer unit (hereinafter referred to as an (a) monomer unit in some places), greater than or equal to 16% by weight and less than 72% by weight of at least one monomer unit selected from the group consisting of aromatic vinyl compound monomer units and methacrylate monomer units (hereinafter referred to as a (b) monomer unit in some places), 0–25% by weight of another vinyl compound monomer unit (hereinafter referred to as a (c) monomer unit in some places) and which contains, in said maleimide copolymer, 0.1% by weight or less of the residual maleimide monomer and 0.5% by weight or less of volatile components other than the maleimide monomer and which has a ratio (Mw/Mn) of a weight average molecular weight Mw to a number average molecular weight Mn of 3 or less, a yellowness index (YI) of 30 or less and an intrinsic viscosity of from 0.3 to 1.5.

Also, the present invention relates to a process for producing a maleimide copolymer which contains 0.1% by weight or less of the residual maleimide monomer and 0.5% by weight or less of volatile components other than the maleimide monomer and which has a ratio (Mw/Mn) of a weight average molecular weight Mw to a number average molecular weight Mn of 3 or less, a yellowness index of 30 or less and an intrinsic viscosity of from 0.3 to 1.5, comprising dropping continuously a maleimide monomer (hereinafter referred to as (a) monomer in some places), at least one monomer selected from the group consisting of aromatic vinyl compound monomers and methacrylate monomers (hereinafter referred to as (b) monomer in some places) and, if necessary, another vinyl compound monomer (hereinafter referred to as (c) monomer in some places), and an organic solvent in a ratio by weight of these monomers to the organic solvent between 3:2–9:1 and a polymerization initiator, if necessary, to a stirred tank reactor thereby continuing a copolymerization reaction, and taking out polymerization products containing unreacted monomers and the organic solvent continuously from the stirred tank reactor so as to maintain a constant composition of the monomers, a constant concentration of the polymerization products and a constant concentration of the polymerization initiator added if necessary thereby maintaining a continuous polymerization in a stationary state and thereafter, if necessary, polymerizing the unreacted maleimide monomer in the second polymerization reactor and transferring the obtained polymerization products to a devolatilizer and removing the unreacted monomers and the organic solvent at a reduced pressure, in the production of a maleimide copolymer which consists essentially of greater than 28% by weight and less than or equal to 65% by weight of a maleimide monomer unit, greater than or equal to 16% by weight and less than 72% by weight of at least one monomer unit selected from the group consisting of aromatic vinyl compound monomer units and methacrylate monomer units, 0–25% by weight of another vinyl compound monomer unit.

BRIEF DESCRIPTION OF THE DRAWING

In FIG. 2, 1 represents stirred tank reactor (the first polymerization reactor), 2 and 4 geared pumps, 3 the second polymerization reactor, 5 a devolatilizer-extruder and 6 a pelletizer.

PREFERRED EMBODIMENT OF THE INVENTION

Figure 1:
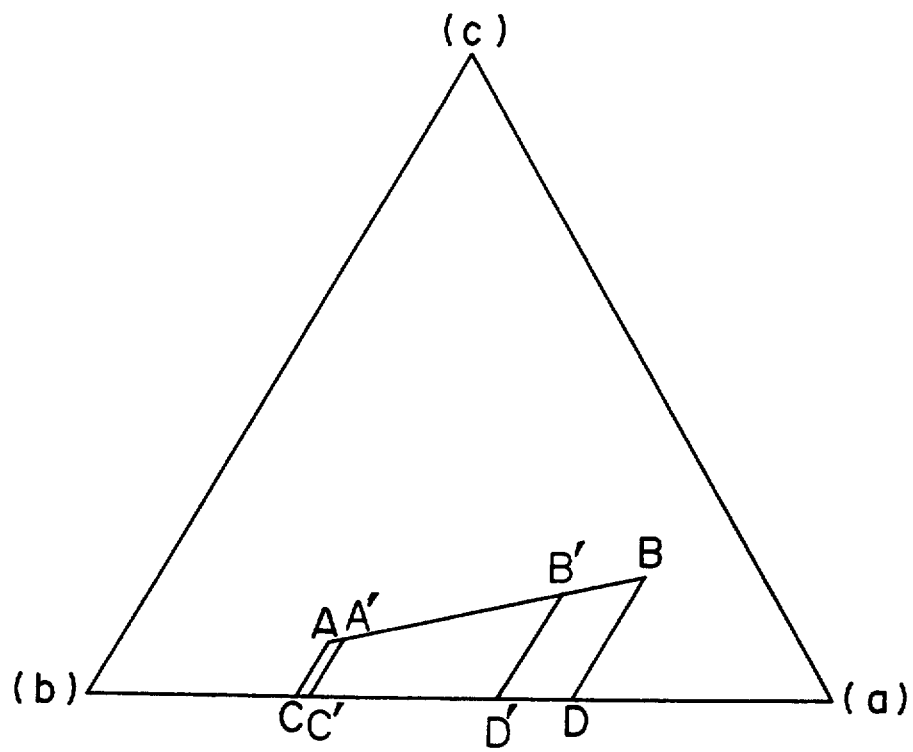
FIG. 1 is a triangular coordinate showing the region of the preferred composition of the maleimide copolymer according to the present invention and FIG. 2 is an example of an apparatus used in the present invention.

A maleimide monomer ((a) monomer) and a maleimide monomer unit ((a) monomer unit) are represented by the following formulae (I) and (II), respectively in the present invention:

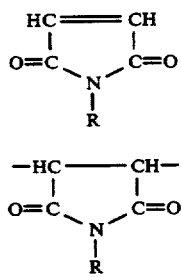

where R represents a hydrogen atom, an alkyl group having 1–4 carbon atoms, a cyclohexyl group, an aryl group or a substituted aryl group in the both formulae.

Maleimide monomers and those of maleimide monomer units each include maleimide, N-methylmaleimide, N-ethylmaleimide, N-propylmaleimide, N-isopropylmaleimide, N-cyclohexylmaleimide, N-phenylmaleimide, N-toluylmaleimide, N-xylylmaleimide, N-naphthylmaleimide, N-tert-butylmaleimide, N-orthochlorophenylmaleimide, N-orthomethoxyphenylmaleimide and the like. Preferably used are N-cyclohexylmaleimide, N-phenylmaleimide, N-orthochlorophenylmaleimide and N-orthomethoxyphenylmaleimide and more preferably used are N-cyclohexylmaleimide and N-phenylmaleimide.

These maleimide monomers can be used alone or in combination.

In the maleimide copolymer of the present invention, the content of (a) monomer unit is in a range of greater than 28% by weight and less than or equal to 65% by weight, preferably in a range of more than 28% by weight and less than or equal to 55% by weight based on the maleimide copolymer. When the content is 28% by weight or less, the obtained maleimide copolymer is inferior in heat resistance to polycarbonate resins. When the content is more than 65% by weight, the obtained maleimide copolymer is inferior in impact resistance and fluidity.

Used as a (b) monomer or that of a (b) monomer unit is at least one monomer selected from the group consisting of the above-mentioned aromatic vinyl compound monomers and methacrylate monomers.

Aromatic vinyl compound monomers include styrene, α-methylstyrene, p-methylstyrene, tert-butylstyrene, chlorostyrene, vinyltoluene and the like. Preferred are styrene and α-methylstyrene.

Methacrylate monomers include methyl methacrylate, ethyl methacrylate, propyl methacrylate, butyl methacrylate, phenyl methacrylate, isobornyl methacrylate, benzyl methacrylate, trifluoroethyl methacrylate and the like.

In the maleimide copolymer of the present invention, the content of (b) monomer unit is in a range of greater than or equal to 16% by weight and less than 72% by weight, preferably in a range of greater than or equal to 29% by weight and less than 72% by weight based on the maleimide copolymer. When the content is less than 16% by weight, the obtained maleimide copolymer is inferior in moldability. When the content is 72% by weight or more, the obtained maleimide copolymer is inferior in heat resistance since the content of the maleimide monomer unit is lowered.

As (c) monomers and those of (c) monomer units existing optionally in the maleimide copolymers of the present invention, there are used vinyl cyanide monomers, acrylate monomers, unsaturated dicarboxylic acid anhydride monomers and vinyl carboxylic acid monomers.

The vinyl cyanide monomers include acrylonitrile, methacrylonitrile, fumaronitril and the like. Acrylonitrile is preferred.

The acrylate monomers include methyl acrylate, ethyl acrylate, propyl acrylate, butyl acrylate, cyclohexyl acrylate and the like.

The unsaturated dicarboxylic acid anhydride monomers include maleic anhydride, itaconic anhydride, citraconic anhydride and the like. Maleic anhydride is preferred.

The vinyl carboxylic acid monomers include acrylic acid, methacrylic acid and the like.

Preferred as the (c) monomer is acrylonitrile, maleic anhydride or methacrylic acid.

These (c) monomer can be, if necessary, used alone or in combination.

The content of a (c) monomer unit in the maleimide copolymer of the present invention is in a range of 0–25% by weight, preferably in a range of 0–9% by weight, more preferably in a range of 0–16% by weight based on the maleimide copolymer. When the content is more than 25% by weight, the properties of the obtained maleimide copolymer are out of the objects of the present invention.

The total weight of all the three monomer units is equal to the weight of the pure maleimide copolymer.

When a vinyl cyanide monomer, particularly acrylonitrile is used as a (c) monomer, the proportion by weight of the (a) monomer unit, the (b) monomer unit and the (c) monomer unit is preferred to lie in a region encompassed with a quadrilateral having the vertex A where (a):(b):(c)=28:64:8, the vertex B where (a):(b):(c)=65:16:19, the vertex C where (a):(b):(c)=28:72:0 add the vertex D where (a):(b):(c)=65:35:0 in the triangular coordinate shown in FIG. 1 in order to obtain a maleimide copolymer excellent in heat resistance, transparency and fluidity.

More preferably, the proportion lies in a region encompassed with a quadrilateral having the vertex A' where (a):(b):(c)=30:61:9, the vertex B' where (a):(b):(c)=55:29:16, the vertex C' where (a):(b):(c)=30:70:0 and the vertex D' where (a):(b):(c)=55:45:0.

In the maleimide copolymer, the content of the residual maleimide monomer must be 0.1% by weight or less, preferably 0.05% by weight or less and the total content of volatile components other than the maleimide copolymer must be 0.5% by weight or less, preferably 0.4% by weight or less. When the content of the residual maleimide monomer is more than 0.1% by weight, the maleimide copolymer is often inferior in transparency due to considerable coloring as well as in weather resistance, and easy to cause coloring due to heat. Further, such a maleimide copolymer has a drawback in that bleedout occurs in the molding thereof.

As volatile components other than the maleimide monomer, there are exemplified monomers such as the other constitutional components of the copolymer and the organic solvent. When the total content of the volatile components is more than 0.5% by weight, the maleimide copolymer is inferior in heat resistance and causes silver streaks in molding at a high temperature.

The ratio of a weight average molecular weight Mw to a number average molecular weight Mn, that is Mw/Mn, of the maleimide copolymer of the present invention is 3 or less, preferably 2.8 or less, more preferably 2.5 or less. An Mw/Mn value is widely used as a measure of the spread of a molecular weight distribution. When the value is more than 3, the maleimide copolymer is inferior in impact resistance and transparency.

In the present invention, Mw and Mn can be calculated by converting an elution curve obtained by gel permiation chromatography (GPC) into molecular weights of standard polystyrene samples.

A yellowness index is 30 or less, preferably 25 or less. The yellowness index is measured using a molded plate obtained from the maleimide copolymer. The yellowness index is closely connected with the amount of the residual maleimide monomer and a vinyl cyanide monomer used optionally as a (c) monomer. When a yellowness index is more than 30, the maleimide copolymer is inferior in transparency and impact resistance since it has a wide composition distribution.

An intrinsic viscosity of a maleimide copolymer according to the present invention is in a range of 0.3–1.5, preferably 0.5–1.2. The intrinsic viscosity is measured at 25° C. with a Ubbellohde viscometer using a solution of the maleimide copolymer in N, N-dimethylformamide. A maleimide copolymer having an intrinsic viscosity of less than 0.3 is inferior in impact resistance. A maleimide copolymer having an intrinsic viscosity of more than 1.5 is inferior in fluidity and therefore hard to be molded though it is superior in impact resistance.

The maleimide copolymer of the present invention is required to satisfy all the conditions of an amount of the residual maleimide monomer, an amount of volatile components other than the maleimide copolymer, a ratio Mw/Mn, a yellowness index and an intrinsic viscosity.

Bulk polymerization is basically conducted in order to produce the maleimide copolymer of the present invention. At this time, an organic solvent should be added to the reaction system.

That is to say, in the present invention, it is required that to a stirred tank reactor continuously dropped a maleimide monomer, at least one monomer selected from the group consisting of aromatic vinyl compound monomers and methacrylate monomers, another vinyl compound monomer, if necessary, and an organic solvent in a ratio by weight of these monomers to the solvent between 3:2–9:1, preferably 3:2–8:2 and a polymerization initiator, if necessary, whereby the copolymerization reaction is continued.

These monomers are different in polymerization activity from one another. Therefore, in order to obtain the maleimide copolymer of the above-mentioned composition, a composition of a mixture of fed monomers is properly selected depending upon their polymerization activities. A preferable composition of a mixture of fed monomers is selected from a range of 7–50 parts by weight of an (a) monomer and 40–90 parts by weight of a (b) monomer and, if necessary, 0–30 parts by weight of a (c) monomer when the total amount of these three monomers is 100 parts by weight.

When the amount of the organic solvent is so small that it is out of the above range of a ratio, a viscosity of reaction system becomes high and therefore the reaction system is hard to be stirred and hard to allow the polymerization product to be taken out. Further, when a viscosity is increased, heat transfer grows worse and ununiformity of temperature in the reaction system causes the widening of molecular weight distribution and composition distribution.

In contrast, when the amount of the oragnic solvent is so large that it is out of the above range of a ratio, a rate of polymerization becomes low and the whole quantity of the organic solvent is hard to be removed in a devolatilization step to make productivity low.

The organic solvent used in the present invention should neither polymerize by itself nor inhibit the polymerization of the above-mentioned monomers and should be able to dissolve the maleimide copolymer of the present invention.

The organic solvents include methyl ethyl ketone, diethyl ketone, methyl isobutyl ketone, acetophenone, benzene, toluene, ethylbenzene, xylene, tetrahydrofuran, N,N-dimethylformamide and the like.

Further in the present invention, a polymerization initiator can be added if necessary.

As a polymerization initiator, there can be used a generally known organic peroxide, azo compound or the like.

The organic peroxides include ketone peroxides, peroxyketals, hydroperoxides, dialkylperoxides, diacylperoxides, peroxyesters, peroxydicarbonates and the like. Particularly preferred are those having a half-life period of 10 hours at a temperature of from 80° C. to 140° C.

The organic peroxides specifically include methyl ethyl ketone peroxide, methyl isobutyl ketone peroxide, methyl cyclohexanone peroxide, acetylacetone peroxide, 1,1-dibutyl peroxy-3,3,5-trimethylcyclohexane, 1,1-dibutylperoxycyclohexane, 2,2-di-tert-butylperoxybutane, 2,2,4-trimethylpentyl-2-hydroperoxide, dicumyl peroxide, 2,5-dimethyl-2,5-di-(tert-butylperoxy)hexane, tert-butyl cumyl peroxide, di-tert-butyl peroxide, tris-(tert-butylperoxy)triazine, di-tert-butylperoxyhexahydroterephthalate, di-tert-butylperoxy azelate, tert-butylperoxy acetate, tert-butylperoxy benzoate, tert-butylperoxy laurate, tert-butylperoxy isopropyl carbonate and the like.

The azo compounds include 1,1′-azobis(cyclohexane-1-carbonitrile), 2-phenylazo-4-methoxy-2,4-dimethylvaleronitrile, 2,2′-azobis(2,4,4-trimethylpentane) and the like.

In a process for producing a maleimide copolymer according to the present invention, it is important to continue a copolymerization reaction maintaining a particular range of a ratio of monomers to an organic solvent and take out continuously the polymerization products from the reaction system and simultaneously feed the monomers and the organic solvent to the reaction system. That is to say, it is important to conduct a continuous polymerization. Thereby, there can be produced a maleimide copolymer having a narrow composition distribution and a narrow molecular weight distribution.

In the continuous polymerization at a stationary state, the polymerization products are taken out from the stirred tank reactor so as to maintain a constant composition of the monomers, a constant concentration of the polymerization products and a constant concentration of a polymerization initiator added if necessary when a polymerization conversion of all the monomers fed in the reaction system is in a range of 30%–70%.

When the polymerization products are taken out at the polymerization conversion of less than 30%, unreacted monomers are hard to be removed in a devolatilizer. In this case, further, when the polymerization conversion is increased in the second polymerization reactor set up if necessary, the obtained maleimide copolymer has a wide molecular weight distribution and a wide composition distribution, and is inferior in impact resistance and transparency.

When the polymerization is conducted to a polymerization conversion of more than 70%, the viscosity of the reaction mixture is so high that the reaction mixture is hard to be stirred and hard to allow the polymerization products to be taken out. In this case, further, the obtained maleimide copolymer has a wide molecular weight distribution and a wide composition distribution and is inferior in impact resistance and transparency.

In the present invention, the polymerization products taken out from the stirred tank reactor (the first polymerization reactor) are, if necessary, transferred to the second polymerization reactor. After unreacted monomers are at least polymerized in the second polymerization reactor, the resulting polymerization products are further transferred to a devolatilizer. In the devolatilizer, the unreacted monomers and an organic solvent are removed at a reduced pressure.

In the second polymerization reactor, a polymerization conversion can be further increased. The unreacted maleimide monomer in the polymerization products should be polymerized before the polymerization products are transferred to the devolatilizer though the degree of polymerization is not preferred to be too high. When the devolatilization is conducted in the presence of the unreacted maleimide monomer, the resulting maleimide copolymer is considerably colored.

As a devolatilizer, there is used a multivent-type devolatilizer-extruder, a flash-type devolatilizer, a film-type devolatilizer or the like. These devolatilizers can be used in combination, too.

The maleimide copolymer obtained according to the above-mentioned various steps contains, in the maleimide copolymer, 0.1% by weight or less of the residue maleimide monomer and 0.5% by weight or less of volatile components other than the maleimide monomer and has an Mw/Mn of 3 or less, a yellowness index of 30 or less and an intrinsic viscosity of 0.3–1.5.

The maleimide copolymer of the present invention is excellent in heat resistance, transparency, chemical resistance, impact resistance, moldability and the like. Further, according to the process for producing a maleimide copolymer of the present invention, there can be produced a maleimide copolymer having various excellent properties.

The maleimide copolymer of the present invention can be utilized for injection molding and extrusion molding as the ordinary thermoplastic resins. Since the maleimide copolymer of the present invention is good in chemical resistance as compared with polycarbonate resins, it can be utilized for painting, too. Further, since the maleimide copolymer is suitable for surface treatments such as plating, vapor deposition, sputtering and the like, it can be utilized for more applications than the conventional transparent heat-resistant materials can.

The present invention is explained specifically below referring Examples and Comparative Examples.

Hereinafter, "part(s) by weight" is referred to as "part(s)".

Various measurements were conducted according to the following method.

The amount of a copolymer in a copolymerization reaction mixture was calculated as the weight of the copolymer obtained by diluting the copolymerization reaction mixture with methyl ethyl ketone and then reprecipitating it with methanol. Analyses of composition, measurements of viscosities and GPC measurements were conducted using the reprecipitated copolymer.

The amount of unreacted monomers left in the copolymerization reaction mixture or residual monomers left after devolatilization was measured by gas chromatography.

The amount of each constitutional monomer unit of the copolymer was calculated from the value of absorption by the characteristic group of each in infrared absorption spectra.

The intrinsic viscosity ($\eta$) of the copolymer was measured at 25° C. with a Ubbellohde viscometer using the solution of the copolymer in N,N-dimethylformamide.

The ratio Mw/Mn was calculated from an elution curve of a GPC chromatogram using standard polystyrene polymers.

Melt flow index (MI) was measured as a discharged weight (g) in 10 minutes measured at 230° C. under a load of 10 kg according to ASTM D-1238.

Izod impact strength, Rockwell hardness, Vicat softening temperature, yellowness index (YI), all light transmittance and haze were measured according to the following methods:

Izod impact strength: ASTM D-256 (with a ¼" notch)
Rockwell hardness: ASTM D-785 (in a unit of M scale)
Vicat softening temperature: ASTM D-1525 (under 5 kg load)
Yellowness index (YI): ASTM D-1925 (measured using a molded plate of 3 mm in thickness)
All light transmittance: ASTM D-1003 (do.)
Haze: ASTM D-1003

EXAMPLES 1–6

Figure 2:
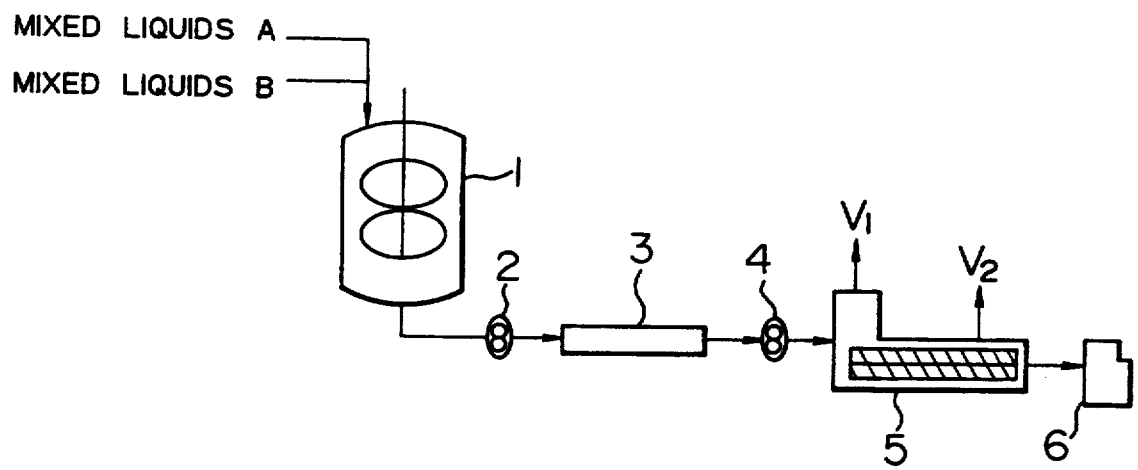

A maleimide copolymer was produced using a production apparatus shown in FIG. 2.

A stirred tank reactor (the first polymerization reactor) was evacuated with a vacuum pump and thereafter nitrogen gas was introduced thereinto. This operation was repeated once more to substitute entirely nitrogen for air in the reactor. Thereafter, copolymerization experiments were carried out.

First, various mixed liquids A and mixed liquids B having components shown in Table 1 were each continuously dropped in the first polymerization reactor through each of separate pipings to be subjected to copolymerization reaction under the conditions of a polymerization temperature and a residence time shown in Table 1. At the point of time when the polymerization conversion of the fed monomers reached the value shown in Table 1, polymerization products of the same amount as the total amount of all the fed monomers were taken out continuously from the bottom of the reactor with a geared pump 2. The copolymerization reaction mixture which went out from the first polymerization reactor 1 was transferred to the (extruder-type) second polymerization reactor 3 with a geared pump 2. The residual maleimide monomer was further polymerized at the operation temperature range shown in Table 2 in the second polymerization reactor 3 to reduce the amount of the residual maleimide monomer drastically. Thereafter, the copolymerization reaction products were supplied from the second polymerization reactor 3 to a devolatilizer-extruder 5 with a geared pump 4. The compositions of the copolymerization reaction mixtures obtained at the exit of the second polymerization reactor 3 are shown in Table 2. The devolatilizer-extruder 5 was a two-vent and two-shaft type extruder ($V_1$ and $V_2$ represent these vents in FIG. 2). After the residual monomers and the organic solvent and the like were removed with the devolatilizer-extruder 5, the copolymerization reaction products were pelletized to obtain a transparent pellet. In Table 3 are shown the operation conditions of the devolatilizer-extruder 5 and the contents of each of the residual matter and monomer units existing in the obtained maleimide copolymers. Also, in Table 4 are shown various physical properties of the obtained maleimide copolymers.

COMPARATIVE EXAMPLE 1

The same procedure was repeated as in Example 1 to obtain a maleimide copolymer, except that the barrel temperature in the devolatilizer-extruder 5 and the degree of vacuum in the vent ($V_2$) were set up as shown in Table 3. The amount of the volatile components in this maleimide copolymer was a high value of 1.02% by weight. Various production conditions and physical properties are shown in Tables 1–4.

COMPARATIVE EXAMPLE 2

Production of a Maleimide Copolymer by Emulsion Polymerization

Into a glass reactor with a stirrer having a volume of 5 l were charged the following substances:

| | |
|---|---|
| pure water | 200 parts |
| sodium dodecylbenzenesulfonate | 2 parts |
| Rongalite | 0.5 part |
| ferrous sulfate | 0.005 part |
| disodium ethylenediaminetetraacetate | 0.01 part. |

The fed mixture was heated at 60° C. and thereafter a mixture of the following formula was dropped thereto continuously in 3 hours keeping an inner temperature of 60° C.:

| | |
|---|---|
| acrylonitrile | 15 parts |
| styrene | 55 parts |
| N-phenylmaleimide | 30 parts |
| cumenehydroperoxide | 0.5 part. |

After the dropping was completed, the copolymerization reaction mixture was allowed to stand at 60° C. for 1 hour and then cooled.

The obtained maleimide copolymer latex was coagulated with magnesium sulfate and dehydrated and dried to obtain the maleimide copolymer in the form of white powder. The maleimide copolymer was inferior in transparency. Various physical properties are shown in Tables 3 and 4.

COMPARATIVE EXAMPLE 3

The same procedure was repeated as in Example 1 to obtain a maleimide copolymer, except that the copolymerization reaction mixture was supplied from the first polymerization reactor directly to the devolatilizer-extruder 5 through a geared pump 2 and the degree of vcacum in the vent ($V_2$) of the devolatilizer-extruder 5 was set up as shown in Table 3. Various production conditions and physical properties are shown in Tables 1–4. As a result, there was obtained a maleimide copolymer having a large amount of the residual maleimide monomer and the volatile components, which was inferior in heat resistance to the maleimide copolymer obtained in Example 1. Numerous silver streaks occurred on the molded plate.

COMPARATIVE EXAMPLE 4

The same procedure was repeated as in Example 1 to obtain a maleimide copolymer, except that 0.3 part of tert-dodecylmercaptane as a chain transfer agent was further added to the mixed liquids A. Various production conditions and physical properties are shown in Tables 1–4. The obtained maleimide copolymer had a low intrinsic viscosity and a low Izod impact strength.

COMPARATIVE EXAMPLE 5

The same procedure was repeated as in Example 1 to obtain a maleimide copolymer, except that the proportion of methyl ethyl ketone was higher than in Example 1 as shown in Table 1. Various production conditions and physical properties are shown in Tables 1–4. The maleimide copolymer was inferior in heat resistance since the removal of methyl ethyl ketone was not completely achieved in the devolatilization step.

COMPARATIVE EXAMPLE 6

The same procedure was repeated as in Example 1 to obtain a maleimide copolymer, except that the proportion of methyl ethyl ketone was lower than in Example 1 as shown in Table 1. Various production conditions and physical properties are shown in Tables 1–4. The copolymerization reaction was stopped since the viscosity of the copolymerization reaction mixture became too high to be stirred.

COMPARATIVE EXAMPLE 7

The same procedure was repeated as in Example 1 to obtain a maleimide copolymer, except that the fed amount of N-phenylmaleimide was lower as shown in Table 1. Various production conditions and physical properties are shown in Tables 1–4. The obtained maleimide copolymer was inferior in heat resistance.

TABLE 1

| | Composition of copolymerization reaction mixture | | | | | | | | Polymerization conversion in the first polymerization reactor (%) |
|---|---|---|---|---|---|---|---|---|---|---|
| | Mixed liquids A (part) | | | | | Mixed liquids B (part) | | Polymerization temperature (°C.) | Residence time (hour) | |
| | N-phenyl-maleimide | Cyclo-hexyl-maleimide | Sty-rene | Methyl meth-acrylate | Acrylo-nitrile | Methyl-ethyl ketone | Polymeri-* zation initiator | | | |
| Example | | | | | | | | | | |
| 1 | 14 | — | 42 | — | 14 | 30 | 0.07 | 100 | 1.5 | 50 |
| 2 | 17 | — | 39 | — | 14 | 30 | 0.07 | 100 | 1 | 55 |
| 3 | 10 | — | 50 | — | 10 | 30 | 0.07 | 100 | 1 | 38 |
| 4 | 15 | — | 55 | — | — | 30 | 0.1 | 100 | 1 | 46 |
| 5 | 10 | — | 46 | 14 | — | 30 | 0.1 | 100 | 1 | 40 |
| 6 | — | 14 | 42 | — | 14 | 30 | 0.07 | 100 | 1.5 | 50 |
| Comparative Example | | | | | | | | | | |
| 1 | 14 | — | 42 | — | 14 | 30 | 0.07 | 100 | 1.5 | 50 |
| 2 | — | — | — | — | — | — | — | — | — | — |
| 3 | 14 | — | 42 | — | 14 | 30 | 0.07 | 100 | 1.5 | 50 |
| 4 | 14 | — | 42 | — | 14 | 30 | 0.07 | 100 | 1.5 | 50 |
| 5 | 8 | — | 24 | — | 8 | 60 | 0.07 | 100 | 1.5 | 40 |
| 6 | 18 | — | 57 | — | 18 | 7 | 0.07 | 100 | 1.5 | ** |
| 7 | 7 | — | 42 | — | 21 | 30 | 0.1 | 100 | 1 | 41 |

*: 1,1-dibutylperoxy-3,3,5-trimethylcyclohexane
**: Copolymerization was stopped halfway since the copolymerization mixture had too high a viscosity to be stirred.

TABLE 2

| | Range of operation temperature (°C.) | Composition of copolymerization reaction mixture obtained at the exit of the second polymerization reactor (% by weight) | | | | | | |
|---|---|---|---|---|---|---|---|---|
| | | N-phenyl maleimide | Cyclo-hexyl-maleimide | Styrene | Methyl meth-acrylate | Acrylo-nitrile | Methyl ethyl ketone | Maleimide copolymer |
| Example | | | | | | | | |
| 1 | 100–150 | 0.4 | — | 19.8 | — | 9.8 | 30 | 40 |
| 2 | 100–150 | 0.4 | — | 15.8 | — | 9.8 | 30 | 44 |
| 3 | 100–150 | 0.4 | — | 30 | — | 7.6 | 30 | 32 |
| 4 | 100–150 | 0.1 | — | 31.9 | — | — | 30 | 38 |
| 5 | 100–150 | 0.5 | — | 26.1 | 11.4 | — | 30 | 32 |
| 6 | 100–150 | — | 0.6 | 18.8 | — | 10.6 | 30 | 40 |
| Comparative Example | | | | | | | | |
| 1 | 100–150 | 0.4 | — | 19.8 | — | 9.8 | 30 | 40 |
| 2 | — | — | — | — | — | — | — | — |
| 3 | — | — | — | — | — | — | — | — |
| 4 | 100–150 | 0.4 | — | 19.8 | — | 9.8 | 30 | 40 |
| 5 | 100–150 | 0.1 | — | 13.8 | — | 6.1 | 60 | 20 |
| 6 | — | — | — | — | — | — | — | — |
| 7 | 100–150 | 0.1 | — | 20.9 | — | 14 | 30 | 35 |

TABLE 3

| | Temperature of barrel (°C.) | Degrees of vacuum in vents (Torr) | | Residual matter (% by weight) | | | Contents of monomer units in maleimide copolymer (% by weight) | | | | |
|---|---|---|---|---|---|---|---|---|---|---|---|
| | | $V_1$ | $V_2$ | N-phenyl-maleimide | Cyclo-hexyl-maleimide | Volatile* components | N-phenyl-maleimide | Cyclohexyl-maleimide | Styrene | Methyl meth acrylate | Acrylo-nitrile |
| Example | | | | | | | | | | | |
| 1 | 250 | 260 | 20 | 0.001 | — | 0.18 | 35 | — | 55 | — | 10 |
| 2 | 250 | 260 | 20 | 0.018 | — | 0.15 | 40 | — | 52 | — | 8 |
| 3 | 250 | 260 | 20 | 0.005 | — | 0.35 | 30 | — | 63 | — | 7 |
| 4 | 250 | 260 | 20 | <0.001 | — | 0.45 | 40 | — | 60 | — | — |
| 5 | 250 | 260 | 20 | 0.020 | — | 0.48 | 30 | — | 62 | 8 | — |
| 6 | 250 | 260 | 20 | — | 0.005 | 0.20 | — | 33.5 | 58 | — | 8.5 |
| Comparative Example | | | | | | | | | | | |

TABLE 3-continued

| | Temperature of barrel (°C.) | Degrees of vacuum in vents (Torr) | | Residual matter (% by weight) | | | Contents of monomer units in maleimide copolymer (% by weight) | | | | |
|---|---|---|---|---|---|---|---|---|---|---|---|
| | | $V_1$ | $V_2$ | N-phenyl-maleimide | Cyclo-hexyl-maleimide | Volatile* components | N-phenyl-maleimide | Cyclohexyl-maleimide | Styrene | Methyl meth acrylate | Acrylo-nitrile |
| 1 | 240 | 260 | 260 | 0.001 | — | 1.02 | 35 | — | 55 | — | 10 |
| 2 | — | — | — | — | — | — | 31 | — | 54 | — | 15 |
| 3 | 250 | 260 | 760 | 0.5 | — | 3.45 | 38 | — | 54 | — | 8 |
| 4 | 250 | 260 | 20 | 0.001 | — | 0.20 | 35 | — | 55 | — | 10 |
| 5 | 250 | 260 | 20 | 0.002 | — | 2.0 | 40 | — | 51 | — | 9 |
| 6 | — | — | — | — | — | — | — | — | — | — | — |
| 7 | 250 | 260 | 20 | <0.001 | — | 0.17 | 20 | — | 60 | — | 20 |

*: The total residual content of monomers other than N-phenylmaleimide and organic solvent.

TABLE 4

| | Izod impact strength (kg·cm/cm) | MI (g/10 min) | Rockwell hardness | Vicat softening temperature (°C.) | Intrinsic viscosity [η] | Mw/Mn | YI | All light transmittance (%) | Haze (%) |
|---|---|---|---|---|---|---|---|---|---|
| Example | | | | | | | | | |
| 1 | 2.3 | 0.77 | 97 | 151 | 0.82 | 2 | 14 | 89 | 1.2 |
| 2 | 2 | 0.26 | 99.9 | 158.7 | 0.8 | 2.1 | 15.2 | 88.5 | 1.3 |
| 3 | 2.8 | 0.82 | 94.2 | 143.0 | 0.82 | 2 | 12.5 | 89.2 | 1.2 |
| 4 | 1.8 | 0.8 | 96 | 156.5 | 0.5 | 2.3 | 9 | 80.1 | 1.8 |
| 5 | 2.1 | 0.78 | 96.1 | 141.5 | 0.78 | 2.2 | 8.1 | 90.3 | 1.0 |
| 6 | 2.1 | 0.85 | 97 | 145 | 0.80 | 2.2 | 10 | 87 | 1.3 |
| Comparative Example | | | | | | | | | |
| 1 | 2.4 | 1.34 | 94.7 | 144.1 | 0.8 | 2 | 14.2 | 89.1 | 1.3 |
| 2 | 1.5 | 1.48 | 90.3 | 135.8 | 0.75 | 3.5 | 42 | 77.7 | 14.8 |
| 3 | 2.3 | 1.2 | 97.2 | 131 | 0.81 | 2.1 | 35.5 | 78.6 | 11.0 |
| 4 | 0.8 | 4.5 | 97.3 | 152 | 0.28 | 2.3 | 14.1 | 89 | 1.2 |
| 5 | 2.3 | 0.8 | 95.5 | 136 | 0.81 | 2.3 | 15.2 | 88.8 | 1.3 |
| 6 | — | — | — | — | — | — | — | — | — |
| 7 | 2.3 | 0.1 | 92.1 | 135 | 0.71 | 1.9 | 11.1 | 90 | 1.2 |

What is claimed is:

1. A maleimide copolymer which consists essentially of:

an (a) monomer unit consisting of greater than 28% and up to 65% by weight of a maleimide monomer unit;

a (b) monomer unit consisting of at least 16% and less than 72% by weight of at least one monomer unit selected from the group consisting of aromatic vinyl compound monomer units and methacrylic monomer units, and a (c) monomer unit consisting of up to 25 % by weight of acrylonitrile, wherein the proportions, by weight, of the (a), (b), and (c) monomer units lie in a region encompassed by a quadrilateral having a vertex A wherein (a):(b):(c)=28:64:8, a vertex B wherein (a):(b):(c)=65:16:19, a vertex C wherein (a):(b):(c)=28:72:0 and a vertex D wherein (a):(b):(c)=65:35:0 in the triangular coordinates of FIG. 1, and which copolymer contains, by weight percent, 0.1% or less of residual maleimide monomer and 0.5% or less of volatile components other than the maleimide monomer and has a ratio ($M_w/M_n$) of 3 or less, a yellowness index of 8.1 to 25, an intrinsic viscosity of from 0.3 to 1.5, a Vicat softening point higher than 140° C., an Izod impact strength of at least 1.8 kg.cm/cm, and a haze less than 1.9%, said copolymer being prepared by continuous solution polymerization in a stationary state using an extruder-type second polymerization reactor.

2. A maleimide copolymer according to claim 1, wherein the monomer of the maleimide monomer unit is represented by the formula (I):

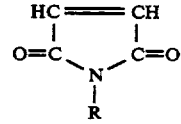

where R represents a hydrogen atom, an alkyl group having 1-4 carbon atoms, a cyclohexyl group, an aryl group or a substituted aryl group.

3. A maleimide copolymer according to claim 2, wherein the monomer of the maleimide monomer unit is N-phenylmaleimide.

4. A maleimide copolymer according to claim 2, wherein the monomer of the maleimide monomer unit is N-cyclohexylmaleimide.

5. A maleimide copolymer according to claim 1, wherein the monomer of the aromatic vinyl compound monomer unit is styrene or α-methylstyrene.

6. A maleimide copolymer according to claim 1, wherein the monomer of the methacrylate monomer unit is methyl methacrylate.

7. A maleimide copolymer according to claim 1, wherein the monomer of the another vinyl compound monomer unit is vinyl cyanide monomer.

8. A maleimide copolymer according to claim 1, wherein the content of the residual maleimide monomer is 0.05% by weight or less and the content of the volatile components other than the maleimide monomer is 0.4% by weight or less.

9. A maleimide copolymer according to claim 1, wherein the yellowness index is less than about 16.

* * * * *